(12) United States Patent
Fukui et al.

(10) Patent No.: US 8,240,169 B2
(45) Date of Patent: Aug. 14, 2012

(54) VITREOUS SILICA CRUCIBLE MANUFACTURING APPARATUS

(75) Inventors: Masanori Fukui, Akita (JP); Hiroshi Kishi, Akita (JP); Masaki Morikawa, Akita (JP)

(73) Assignee: Japan Super Quartz Corporation, Akita (JP)

( * ) Notice: Subject to any disclaimer, the term of this patent is extended or adjusted under 35 U.S.C. 154(b) by 288 days.

(21) Appl. No.: 12/684,178

(22) Filed: Jan. 8, 2010

(65) Prior Publication Data
US 2010/0170298 A1  Jul. 8, 2010

(30) Foreign Application Priority Data

Jan. 8, 2009 (JP) ................................. 2009-002838
Jan. 8, 2010 (JP) ................................. 2010-002611

(51) Int. Cl.
*C03B 19/06* (2006.01)
*H05B 7/22* (2006.01)

(52) U.S. Cl. ............. 65/144; 65/17.3; 65/17.4; 65/152; 65/302; 65/374.15; 219/76.14; 219/383; 373/2; 373/9; 373/60; 373/65

(58) Field of Classification Search ............ 65/355–356; 219/21, 11–13
See application file for complete search history.

(56) References Cited

U.S. PATENT DOCUMENTS

| | | | | |
|---|---|---|---|---|
| 2,185,679 A | * | 1/1940 | Parisot | 313/311 |
| 3,131,290 A | * | 4/1964 | Stepath | 219/137.2 |
| 3,392,227 A | * | 7/1968 | Ostberg | 373/93 |
| 3,900,756 A | * | 8/1975 | Suga | 313/354 |
| 3,941,577 A | * | 3/1976 | Schwenninger | 65/135.7 |
| 4,287,381 A | * | 9/1981 | Montgomery | 373/92 |
| 5,218,757 A | * | 6/1993 | Kaneko et al. | 29/855 |
| 5,978,410 A | * | 11/1999 | Johansen et al. | 373/89 |
| 6,363,098 B1 | * | 3/2002 | Hagihara et al. | 373/88 |
| 6,553,787 B1 | * | 4/2003 | Akiho et al. | 65/17.3 |
| 7,160,387 B2 | * | 1/2007 | Kishi et al. | 117/13 |
| 7,966,715 B2 | * | 6/2011 | Fujita et al. | 29/592.1 |

(Continued)

FOREIGN PATENT DOCUMENTS

JP  07335561 A  * 12/1995

(Continued)

OTHER PUBLICATIONS

English language Abstract of JP 2001-89171.

*Primary Examiner* — Matthew Daniels
*Assistant Examiner* — Jodi C Franklin
(74) *Attorney, Agent, or Firm* — Greenblum & Bernstein P.L.C.

(57) ABSTRACT

A vitreous silica crucible manufacturing apparatus includes a plurality of carbon electrodes configured to heat and melt raw material powder by arc discharge, and a value of a ratio R2/R1 of a diameter R2 of a front end of each of the carbon electrodes to a diameter R1 of a base end is set in a range of 0.6 to 0.8. Each carbon electrode has a diameter reduction portion formed at a front end position and reduced in diameter from a diameter R3 of a base end side to the diameter R2 of the front end. When a length of the diameter reduction portion is L1, the diameter of the front end is R2, the diameter of the base end is R1, an angle between the axis lines of the carbon electrodes is θ1, and X=(R1−R2)/2, a value of L1−(X/tan(θ1/2)) is set in a range of 50 to 150 mm.

14 Claims, 8 Drawing Sheets

U.S. PATENT DOCUMENTS

| | | | |
|---|---|---|---|
| 2003/0210731 A1* | 11/2003 | Fukui et al. | 373/88 |
| 2004/0050099 A1* | 3/2004 | Fukui et al. | 65/17.6 |
| 2005/0000947 A1* | 1/2005 | Sigler | 219/118 |
| 2006/0291525 A1* | 12/2006 | Montminy et al. | 373/92 |
| 2009/0084308 A1* | 4/2009 | Kishi et al. | 117/13 |
| 2009/0145351 A1* | 6/2009 | Kishi et al. | 117/208 |
| 2009/0165700 A1* | 7/2009 | Kishi et al. | 117/13 |
| 2009/0293806 A1 | 12/2009 | Kishi | |
| 2010/0000465 A1 | 1/2010 | Kishi et al. | |
| 2010/0071417 A1 | 3/2010 | Kishi et al. | |
| 2010/0071613 A1 | 3/2010 | Kishi et al. | |
| 2010/0126407 A1* | 5/2010 | Kishi et al. | 117/28 |
| 2010/0224611 A1* | 9/2010 | Kapoor et al. | 219/145.1 |
| 2010/0236473 A1* | 9/2010 | Kishi | 117/208 |
| 2010/0244311 A1* | 9/2010 | Kishi et al. | 264/219 |
| 2011/0295405 A1* | 12/2011 | Sudo et al. | 700/104 |

FOREIGN PATENT DOCUMENTS

| | | | |
|---|---|---|---|
| JP | 2001-097775 | | 4/2001 |
| JP | 2002-068841 | | 3/2002 |
| JP | 2002068841 A | * | 3/2002 |
| JP | 2003-335532 | | 11/2003 |
| JP | 2003313035 A | * | 11/2003 |
| JP | 3647688 | | 2/2005 |
| JP | 2008162840 A | * | 7/2008 |
| JP | 2009161362 A | * | 7/2009 |
| JP | 2010070440 A | * | 4/2010 |
| JP | 2010076949 A | * | 4/2010 |
| JP | 2010076978 A | * | 4/2010 |
| JP | 2010180123 A | * | 8/2010 |

* cited by examiner

VITREOUS SILICA CRUCIBLE MANUFACTURING APPARATUS

TECHNICAL FIELD

The present invention relates to a vitreous silica crucible manufacturing apparatus and, more particularly, a carbon electrode used for performing vitrification by heating and melting quartz powder by arc discharge.

BACKGROUND OF THE INVENTION

A vitreous silica crucible used for pulling up single crystal silicon is mainly manufactured by an arc melting method. In this method, for example, quartz powder is deposited on an inner surface of a mold made of carbon with a predetermined thickness so as to form a quartz powder molded body of quartz deposition, a carbon electrode is mounted above the quartz powder molded body, and the quartz deposition is heated and vitrified by arc discharge, thereby manufacturing the vitreous silica crucible.

Japanese Patent No. 03647688 discloses a technology of manufacturing a vitreous silica crucible by arc melting, and Japanese Patent Application Laid Open Nos. 2002-68841 and 2001-097775 disclose a technology related to an electrode for arc discharge. In addition, Japanese Patent Application Laid Open No. 2003-335532 discloses a technology related to a distance between the electrodes for arc discharge.

Recently, the diameter of a manufactured silicon wafer is increased to exceed 300 mm by a request for efficiency of manufacturing a semiconductor device. Accordingly, a vitreous silica crucible which can pull up single crystal silicon having a large diameter has been required. In addition, improvement of crucible characteristics such as an inner surface state of the vitreous silica crucible, which directly influences on the characteristics of the single crystal silicon, has strongly been required by a request for miniaturization of a semiconductor device.

However, when a vitreous silica crucible having a large diameter of 30 inches to 40 inches is manufactured, the amount of power necessary for melting quartz powder is increased and thus vibration of an electrode, which generates at the time of start-up of arc discharge, is not negligible. When the electrode vibration generates at the time of start-up of arc discharge, current flowing through arc is changed, and the electrode is further vibrated by this current change, thereby further increasing the amplitude of the electrode vibration. As a result, the generated arc becomes unstable and influence on the state of the melted quartz powder is not negligible. In addition, if the electrode vibration is increased, minute pieces stripped from the electrode by the vibration are dropped and thus the characteristics of the vitreous silica crucible deteriorate. In addition, if the amplitude of the electrode vibration is increased, the electrode may be damaged.

In order to prevent the vibration of the electrode, the strength of the electrode should be increased by, for example, being made of a high-strength material or enlarging the diameter of the electrode. With respect to an arc discharge electrode used for manufacturing the vitreous silica crucible, however, this electrode is exhausted and the composition thereof is emitted to a quartz powder melting ambience, resulting in having influence on the characteristics of the crucible. Therefore, only the carbon electrode is used as an arc discharge electrode for manufacturing the vitreous silica crucible. In a case of enlarging the diameter of the electrode, power density deteriorates and, as a result, an arc output deteriorates. In this case, therefore, a processing temperature is decreased and a processed state becomes unstable, thereby having adverse influence on the characteristics of the crucible. In addition, generated fume (silica vapor) is attached to an upper portion of the electrode due to the decrease in the processing temperature, and the characteristics of the vitreous silica crucible can be deteriorated by the dropping of the attached fume. Thus, these means cannot be employed so as to prevent the vibration of the electrode. In addition, the influence of the electrode vibration is caused by the increase in the arc output accompanied by enlargement in the diameter of the crucible.

SUMMARY OF THE INVENTION

The present invention is contrived to solve the above problems and to obtain the following objects.
1. Electrode vibration is prevented.
2. Arc generation is facilitated at the time of start-up of power and stabilization thereafter is achieved.
3. Deterioration of crucible characteristics is prevented and improvement thereof is achieved.
4. A carbon electrode corresponding to large-output arc melting is provided.

In order to solve the above problems, a vitreous silica crucible manufacturing apparatus includes a plurality of carbon electrodes configured to heat and melt raw material powder by arc discharge, wherein a value of a ratio $R2/R1$ of a diameter $R2$ of a front end of each of the carbon electrodes to a diameter $R1$ of a base end thereof is set in a range of 0.6 to 0.8.

In the present invention, a flat surface which is approximately perpendicular to an axis line may be formed on the front end of each of the carbon electrodes.

In the present invention, when the length of a diameter reduction portion formed at a front end position of the carbon electrode and reduced in diameter from a diameter $R3$ of a base end side to the diameter $R2$ of the front end is $L1$, the diameter of the front end is $R2$, the diameter of the base end is $R1$, an angle between the axis lines of the carbon electrodes is $\theta1$, and $X=(R1-R2)/2$, a value of $L1-(X/\tan(\theta1/2))$ may be set in a range of 50 to 150 mm.

In the present invention, a value of a ratio $R3/R1$ of the diameter $R3$ of the base end side of the diameter reduction portion to the diameter $R1$ of the base end of each of the carbon electrodes may be set in a range of 0.8 to 1.

In the present invention, an angle $\alpha$ between a lateral periphery surface of the diameter reduction portion and the flat surface, the length $L1$ of the diameter reduction portion, the diameter $R2$ of the front end, and the diameter $R1$ of the base end may be set to satisfy a relationship of $\tan(90°-\alpha)=X/(L1-50)$ to $X/(L1-150)$ when $X=(R1-R2)/2$.

In the present invention, a half of the angle $\theta1$ between the axis lines of the carbon electrodes may be in a range of 5° to 20°, and the angle $\alpha$ between the lateral periphery surface of the diameter reduction portion and the flat surface may be set to satisfy a relationship of $\theta1 > 2\times(90-\alpha)$.

The vitreous silica crucible manufacturing apparatus of the present invention is a vitreous silica crucible manufacturing apparatus which includes a plurality of carbon electrodes configured to heat and melt raw material powder by arc discharge. A value of a ratio $R2/R1$ of a diameter $R2$ of a front end of each of the carbon electrodes to a diameter $R1$ of a base end is set in a range of 0.6 to 0.8. The electrode diameter $R1$ necessary for maintaining electrode strength in an extremely drastic environment such as arc discharge and the diameter $R2$ of the front end necessary for obtaining suitable power density for obtaining stable arc discharge are obtained.

Accordingly, it is possible to prevent electrode vibration at the time of start-up of power and to maintain stable arc generation during discharge to provide a heat source necessary for manufacture of the vitreous silica crucible.

Here, as the shape of the carbon electrode, preferably, a substantially cylindrical shape may be used, the diameter of only the front end may be reduced from the diameter R1 to the diameter R2, only the front end may have a uniform diameter less than the diameter R1, a step may be formed such that the diameter of only the front end is reduced from the diameter less than the diameter R1 and greater than the diameter R2, or the diameter is reduced from the diameter R1 to the diameter R2 over the entire length.

In the present invention, since the flat surface which is approximately perpendicular to the axis line is formed in the front end of each of the carbon it is possible to facilitate arc generation from an outer periphery of the flat surface and to stably generate arc discharge. Accordingly, it is possible to improve the characteristics (quality) of the manufactured vitreous silica crucible and to provide a vitreous silica crucible which is suitably used for pulling-up of the semiconductor single crystal.

In the present invention, the characteristics of the crucible refers to factors which influence on the characteristics of single crystal silicon pulled up from the vitreous silica crucible, such as vitrification state of the inner surface of the crucible, a bubble distribution in a thickness direction, the size of bubbles, the content of an OH group, the content of impurities such as alkali metal, alkaline earth metal or heavy metal, and distribution of irregularities in a height direction of the crucible.

In the present invention, when the length of a diameter reduction portion formed at a front end position and reduced in diameter from a diameter R3 of a base end side to the diameter R2 of the front end is L1, the diameter of the front end is R2, the diameter of the base end is R1, an angle between the axis lines of the carbon electrodes is $\theta 1$, and $X=(R1-R2)/2$, a value of $L1-(X/\tan(\theta 1/2))$ is set in a range of 50 to 150 mm. Accordingly, one carbon electrode may come in contact with another carbon electrode only at one place. In other words, during arc discharge from the start-up of power supply, since the values of the diameters R3 and R2 are set such that one carbon electrode is nearest to another carbon electrode only at one place which is one point, one linear portion or one surface, it is possible to generate arc discharge in the place having the nearest distance therebetween, to facilitate arc generation, and to stably generate arc discharge.

In the present invention, since the value of the ratio R3/R1 of the diameter R3 of the base end side of the diameter reduction portion to the diameter R1 of the base end of each of the carbon electrodes is set in a range of 0.8 to 1, one place having the nearest distance between the carbon electrodes is provided. Accordingly, it is possible to prevent discharge of a portion other than the front end of the electrode by an unequal electric field and to obtain stable arc generation.

In addition, since the angle $\alpha$ between a lateral periphery surface of the diameter reduction portion and the flat surface, the length L1 of the diameter reduction portion, the diameter R2 of the front end, the diameter R1 of the base end, and $X=(R1-R2)/2$ are set to satisfy a relationship of $\tan(90°-\alpha)=X/(L1-50)$ to $X/(L1-150)$, it is possible to prevent discharge of a portion other than the front end of the electrode by an unequal electric field and to more stably perform arc generation.

In the present invention, since a half of the angle $\theta 1$ between the axis lines of the carbon electrodes is in a range of 5° to 20° and the angle $\alpha$ between the lateral periphery surface of the diameter reduction portion and the flat surface is set to satisfy a relationship of $\theta 1>2\times(90-\alpha)$, one carbon electrode may come in contact with another carbon electrode only at one place or during arc discharge from the start-up of power supply, one carbon electrode is nearest to another carbon electrode only at one place which is one point, one linear portion or one surface. Therefore, it is possible to generate arc discharge in the place having the nearest distance therebetween, to facilitate arc generation, and to stably generate arc discharge.

In addition, the vitreous silica crucible manufacturing apparatus of the present invention may be applied to any one of a manufacturing method of adding quartz powder during arc discharge, which is called a thermal spraying method, and a manufacturing method in which quartz powder is not added during arc discharge, which is call a rotation molding method.

According to the present invention, since it is possible to prevent electrode vibration, to facilitate arc generation, and to stably generate arc discharge, even in a crucible having a large diameter, it is possible to prevent in-plane unevenness of the characteristics in the inner surface of the vitreous silica crucible melted by generated arc flame or deterioration of the crucible surface characteristics.

BRIEF DESCRIPTION OF THE DRAWINGS

The above and other objects, features and advantages of this invention will become more apparent by reference to the following detailed description of the invention taken in conjunction with the accompanying drawings, wherein.

DETAILED DESCRIPTION OF THE EMBODIMENT

Hereinafter, a vitreous silica crucible manufacturing apparatus according to an embodiment of the present invention will be described with reference to the accompanying drawings.

Figure 1:
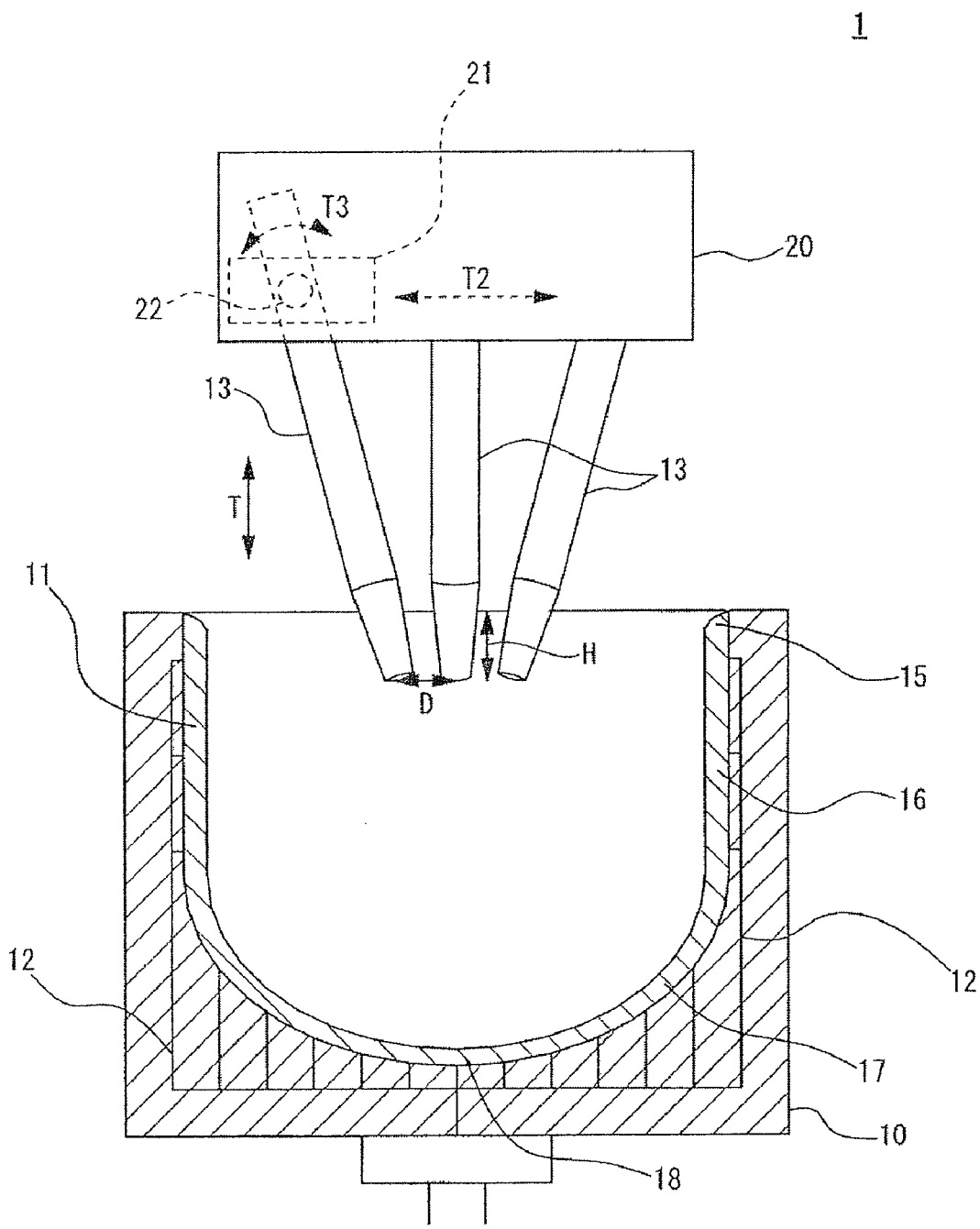
FIG. 1 is a schematic front view showing a vitreous silica crucible manufacturing apparatus according to an embodiment of the present invention.

FIG. 1 is a schematic front view showing a portion of the vitreous silica crucible manufacturing apparatus according to this embodiment of the invention. In FIG. 1, reference numeral 1 is the vitreous silica crucible manufacturing apparatus including an arc discharge device.

The vitreous silica crucible manufacturing apparatus 1 according to this embodiment of the invention is used for manufacturing the vitreous silica crucible having a diameter of 24 inches or more and, more particularly, about 32 to 50 inches. If the vitreous silica crucible manufacturing apparatus 1, however, is used for arc-melting a non-conductor, kinds of materials to be melted, the diameter of the crucible, a device output, and use as heat source are not limited. The present invention is not limited to this configuration.

As shown in FIG. 1, the vitreous silica crucible manufacturing apparatus 1 has a mold 10 which defines the outer shape of the vitreous silica crucible, the mold 10 is rotatable by rotary actuators (not shown), and raw material powder (quartz powder) is filled in the rotating mold 10 with a predetermined thickness so as to form a quartz powder molded body 11. A plurality of ventilation holes 12 are formed in the mold 10. The ventilation hole 12 penetrates to an inner surface of the mold 10 and the other end of which is connected to depressurization means (not shown) such that the inside of the quartz powder molded body 11 can be depressurized. Arc heating carbon electrodes 13, 13 and 13 connected to a power supply (not shown) are formed above the mold 10 such that the quartz powder molded body 11 can be heated. With respect to three carbon electrodes 13, 13 and 13, a vertical position denoted by an arrow T of the drawing and a distance D between the electrodes denoted by an arrow T2 can be set by electrode position setting means 20.

Here, the quartz powder is not limited to quartz but includes powders of known materials as a raw material of the vitreous silica crucible, such as quartz or silica sand including silicon dioxide (silica). The powders may be a crystal state, an amorphous state, and a glass state, and the internal structure thereof is not limited to only quartz.

The vitreous silica crucible manufacturing apparatus 1 is a high-power apparatus for heating and melting a non-conductive object (quartz powder) by arc discharge through the plurality of carbon electrodes 13, 13 and 13 in an output range of 300 kVA to 12,000 kVA.

As shown in FIG. 1, the electrode position setting means 20 includes support portions 21 for supporting the carbon electrodes 13, 13 and 13 to set the distance D between the electrodes, horizontal movement means for moving the support portions 21 in a horizontal direction, and a vertical movement means for integrally moving the plurality of support portions 21 and the horizontal movement means in a vertical direction. The support portions 21 rotatably support the carbon electrodes 13 around an angle setting shaft 22 and have rotary actuators for controlling a rotation angle of the angle setting shaft 22. As denoted by an arrow T3 of FIG. 1, the distance D between the carbon electrodes 13 and 13 is adjusted by controlling the angles of the carbon electrodes 13 through the rotary actuators and controlling the horizontal positions of the support portions 21 through the horizontal movement means. In addition, the height H of the front end 13a of the electrode can be adjusted with respect to the height of the upper end (upper end of mold opening) of the quartz powder molded body 11 by controlling the height of the support portions 21 through the vertical movement means.

In addition, although FIG. 1 shows only the support portion 21 for supporting the left carbon electrode 13, the other carbon electrodes 13 are supported by the same configuration, and the height of each of the carbon electrodes 13 can be independently controlled.

Figure 2:
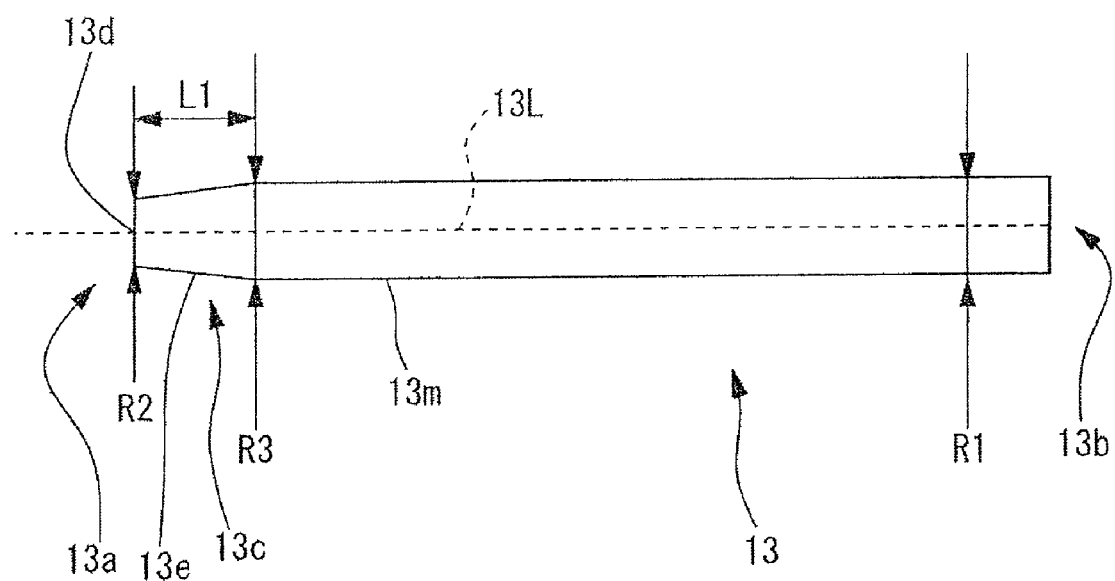
FIG. 2 is a schematic diagram showing a carbon electrode of the vitreous silica crucible manufacturing apparatus according to the embodiment of the present invention.
Figure 3:
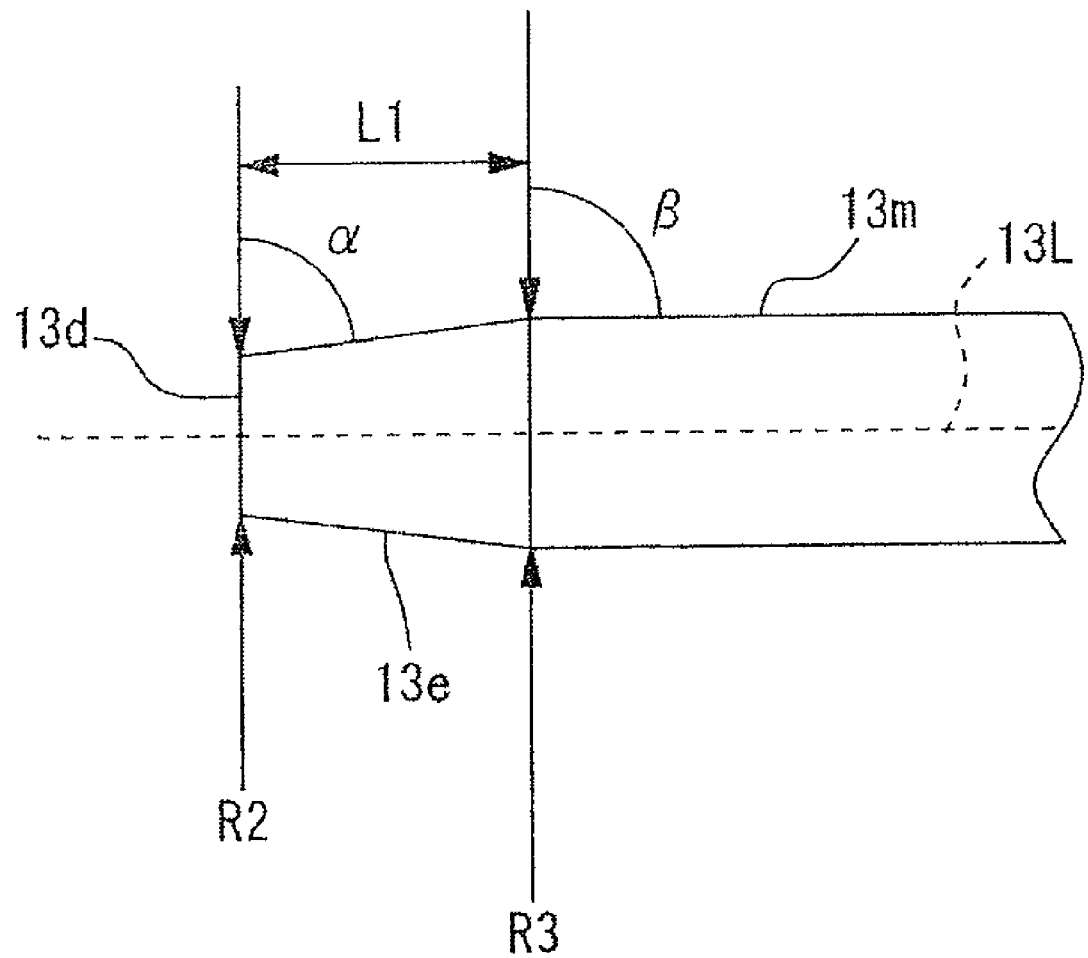
FIG. 3 is an enlarged view of a front end of the carbon electrode of FIG. 2.

FIG. 2 is a schematic diagram showing the carbon electrode 13 of the vitreous silica crucible manufacturing apparatus 1 according to this embodiment of the invention, and FIG. 3 is an enlarged view of a front end of the carbon electrode 13 shown in FIG. 2.

The carbon electrode 13 according to this embodiment of the invention is an approximately cylindrical rod-like body. In the carbon electrode 13, a base end 13b has an approximately uniform diameter R1, and a ratio R2/R1 of the diameter R2 of the front end 13a to the diameter R1 of the base end 13b is set in a range of 0.6 to 0.8. Moreover, a flat surface 13d is formed on the front end 13a so as to be approximately perpendicular to an axis line 13L of the carbon electrode 13, and a diameter reduction portion 13c is formed in the front end 13a such that the diameter R2 of the front end 13a is smaller than the diameter R1 of the base end 13b.

In this embodiment of the invention, the diameter reduction portion 13c has an approximately truncated conical shape of which diameter is gradually reduced from the diameter R3 of the base end 13b to the diameter R2 of the front end 13a. In the relationship between the length L1 of the diameter reduction portion 13c and the diameter R1 of the base end 13b, the diameter R2 of the front end 13a, an angle $\theta1$ between the axis lines 13L of the carbon electrodes 13, if $X=(R1-R2)/2$ is defined, a value of $L1-(X/\tan(\theta1/2))$ is set in a range of 50 to 150 mm and preferably in a range of 50 to 100 mm. A value of a ratio R3/R1 of the diameter R3 of the base end side of the diameter reduction portion 13c to the diameter R1 of the base end of the carbon electrode is set in a range of 0.8 to 1.

In this embodiment of the invention, the diameter R3 of the base end side of the diameter reduction portion 13c is equal to the diameter R1 of the base end 13b.

An angle $\alpha$ between a lateral periphery surface 13e of the diameter reduction portion 13c and the flat surface 13d, the length L1 of the diameter reduction portion 13c, the diameter R1 of the base end 13b, and the diameter R2 of the front end 13a are set to satisfy a relationship of $\tan(90°-\alpha)=X/(L1-50)$ to $X/(L1-150)$, where $X=(R1-R2)/2$. In this embodiment of the invention, an angle $\beta$ between a lateral periphery surface 13m of the base end side and the flat surface 13d is set to 90°.

Figure 4:
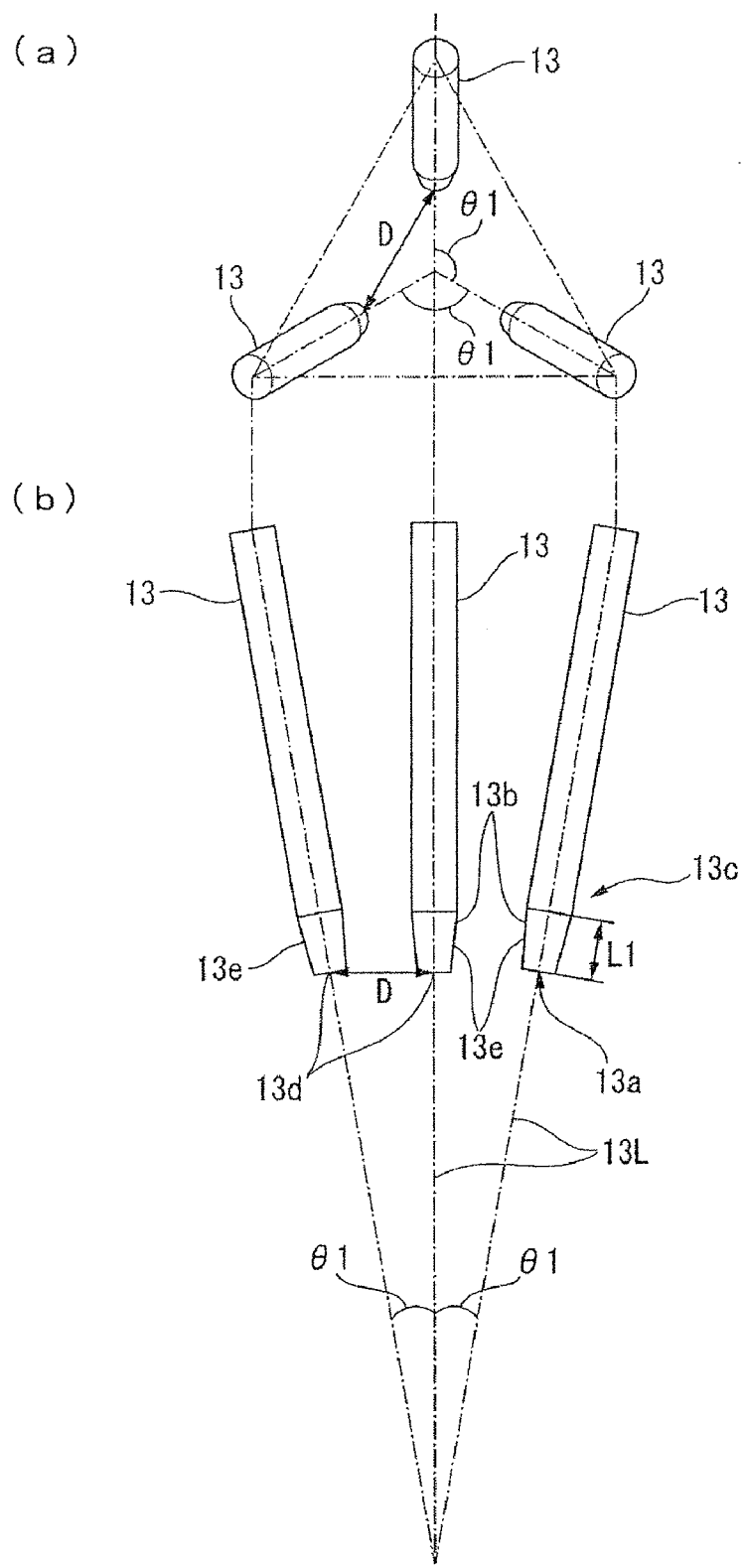
FIG. 4 is a schematic diagram showing the positions of the carbon electrodes of the vitreous silica crucible manufacturing apparatus according to the embodiment of the present invention.

FIG. 4 is a schematic diagram showing the positions of the carbon electrodes of the vitreous silica crucible manufacturing apparatus according to this embodiment of the invention.

The carbon electrodes 13, 13 and 13 are electrode rods having the same shape to perform for example, 3-phase alternating current (R-phase, S-phase and T-phase) arc discharge. Furthermore, the carbon electrodes 13, 13 and 13 have a reverse triangular pyramid shape, an apex of which is located on a lower side, as shown in FIGS. 1 and 4, and the angle between the axis lines 13L of the electrode rods is $\theta1$.

Figure 5:
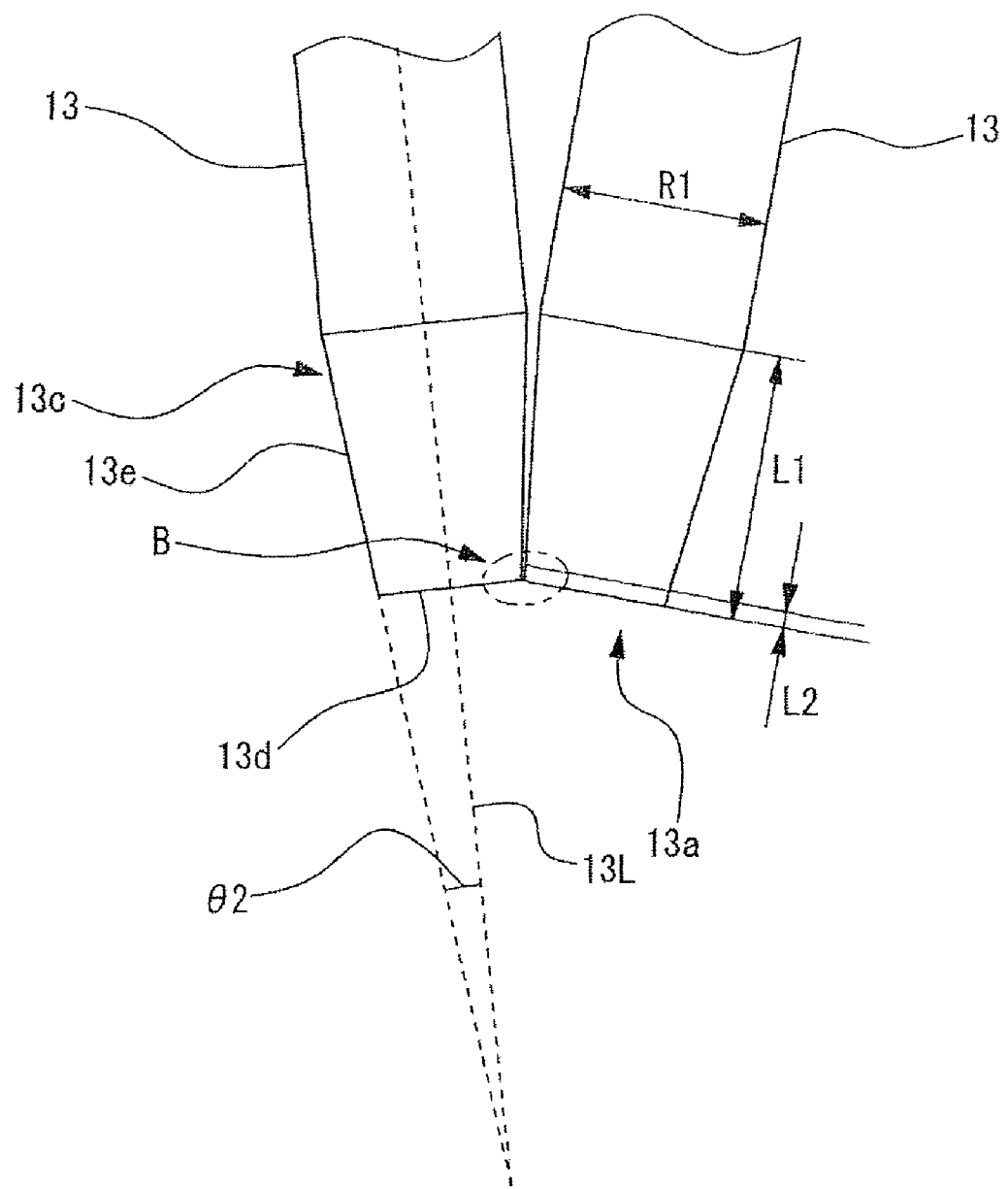
FIG. 5 is an enlarged schematic diagram showing a front end of the carbon electrode in a contact state in the vitreous silica crucible manufacturing apparatus according to the embodiment of the present invention.

FIG. 5 is an enlarged schematic diagram showing the front ends of the carbon electrodes 13 in a state where the carbon electrodes 13 come in contact with each other in the vitreous silica crucible manufacturing apparatus according to this embodiment of the invention. In addition, the contact state of the carbon electrodes 13 is obtained by horizontally moving the support portions 21 through the horizontal movement means of the electrode position setting means such that the distance D between the electrodes becomes zero.

As shown in FIG. 5, in the carbon electrode 13, if the carbon electrodes 13 come in contact with each other when power supply is started, the angle $\theta2$ between the lateral periphery surface 13e and the axis line 13L of the carbon electrode 13 is set such that the contact position is located in the range of the diameter reduction portion 13c and is preferably $\theta1>2\times\theta2$. However, the angle is not limited thereto, if the contact position is in the range of the diameter reduction portion 13c, for example, even when the angle becomes $\theta 1=2\times\theta 2$ and the contact position is located in the vicinity of a boundary between the diameter reduction portion 13c, which is the truncated cone, and the uniform diameter portion. In addition, the angle $\theta 2$ satisfies a following equation, that is, $\theta 2=90°-\alpha$.

The length L1 of the diameter reduction portion 13c becomes L2<L1 with respect to the distance L2 from the front end 13a to the contact position, and a ratio L2/R1 of the distance L2 from the front end 13a to the contact position to the diameter R1 of the carbon electrode 13 is set in a range of 0 to 0.9. Since the lengths L1 and L2 depend on the angle $\theta 1$ between the axis lines 13L of the carbon electrodes 13 and the angle $\theta 2$ between the lateral periphery surface 13e and the axis line 13L of the carbon electrode 13, these ranges are set to satisfy the above condition.

In the carbon electrode 13, a ratio LL/R1 of a length LL exhausted per arc discharge unit time (1 minute) to the diameter R1 of the base end 13b having the uniform diameter portion is set in a range of 0.02 to 0.6. The diameter R1 of the carbon electrode 13 is determined according to conditions such as an arc discharge output, the amount of raw material powder to be melted, which is defined by the diameter (size) the vitreous silica crucible, a temperature of a melting process, a necessary arc discharge duration, and necessary electrode strength. In addition, the diameter R1 of the carbon electrode 13 is defined on the purpose of preventing the generation of the electrode vibration. In detail, in the manufacture of the vitreous silica crucible of 32 inches, the length of about 120 mm is exhausted for 60 minutes, that is, the length of about 2 mm per minute is exhausted. At this time, the diameter R1 of the carbon electrode 13 becomes $\Phi$20 to 120 mm.

The carbon electrode 13 is formed of high-purity carbon grains having a grain diameter of 0.3 mm or less, preferably 0.1 mm or less, and more preferably 0.05 mm or less. When the density of this carbon electrode 13 is 1.30 to 1.80 g/cm$^3$ or 1.30 to 1.70 g/cm$^3$, a difference in density between the carbon electrodes disposed in the phases of the electrodes may become 0.2 g/cm$^3$ or less. By such high homogeneity, the generated arc becomes stable and the local deficiency of the carbon electrode 13 can be prevented.

The carbon electrode 13 may be formed by extrusion molding or CIP molding using a raw material such as coke, for example, coal based pitch coke, and a bonding material such as coal-tar pitch, for example, a mixed material obtained by carbonizing coal based pitch coke as grains. The carbon electrode 13 has wholly a cylindrical shape and the front end thereof is gradually tapered down. The method of manufacturing the carbon electrode by extrusion molding may use following processes: for example, heating and mixing a carbon-based raw material adjusted to obtain a desired grain diameter and the bonding material; performing the extrusion molding on the mixed material obtained by heating and mixing at 130 to 200° C.; baking the resultant by the extrusion molding to obtain a graphitic material graphitized at 2600 to 3100° C.; and working the graphitic material to perform purification by halogen-based gas such as chlorine under heating of 2000° C. or more. The method of manufacturing the carbon electrode by CIP molding may use following processes: heating and mixing a carbon material adjusted to obtain a desired grain diameter and a bonding material; pulverizing and sieving the obtained mixed material; performing CIP molding on the obtained secondary grains; baking the resultant by the CIP molding to obtain a graphitic material graphitized at 2600 to 3100° C.; and working the graphitic material to perform purification by halogen-based gas such as chlorine under heating of 2000° C. or more.

In addition, the vicinity of the front end of the carbon electrode 13 is subjected to a shaping process by grinding so as to have the above shape.

The vitreous silica crucible manufacturing apparatus 1 according to this embodiment of the invention controls the distance between the front ends of the electrodes to an optimal position while maintaining the angle $\theta 1$ between the carbon electrodes 13. For this reason, the vitreous silica crucible manufacturing apparatus 1 supplies power such that power density of the carbon electrodes 13 is 40 to 1,700 kVA/cm$^2$ and more preferably 40 to 450 kVA/cm$^2$, when the arc discharge is performed at the time of manufacture of the vitreous silica crucible.

In detail, the vitreous silica crucible manufacturing apparatus 1 supplies the power of 300 to 12,000 kVA to the carbon electrodes 13 with the diameter R2. If the power density is less than the above range, stable arc cannot be maintained. If the power density is in the above range, however, Lorentz force which causes the increase in the vibration of the electrode can be in an allowable range and thus the generated vibration of the electrode can be stabilized.

Here, the power density refers to the amount of supplied power per unit cross-sectional area of the cross section of the electrode perpendicular to the electrode center axis 13L in the carbon electrode 13. In detail, the power density is expressed by a ratio of power supplied to one electrode to the cross-sectional area of the electrode perpendicular to the electrode center axis 13L at a position of an axial length of about 15 to 25 mm and more preferably 20 mm from the front end 13a of the electrode, that is, amount of supplied power (kVA)/cross-sectional area of the electrode (cm$^2$).

As described above, the vitreous silica crucible manufacturing apparatus 1 sets the shape of the carbon electrode 13 and sets the electrode position at the time of power supply and arc generation, thereby setting the shortest distance between the carbon electrodes 13 at the position of the outer periphery 13da of the flat surface 13d. Therefore, the vitreous silica crucible manufacturing apparatus 1 can simultaneously prevent arc generation and electrode vibration generation in a portion other than the front end 13a and can realize optimal current density in arc generation, resulting in facilitating arc generation and stably generating arc discharge. Since the vitreous silica crucible manufacturing apparatus 1 can realize the stable arc, it is possible to prevent minute pieces from being dropped from the carbon electrode 13 onto the inner surface of the crucible, which is an object to be melted, and being introduced thereinto.

According to this embodiment of the invention, since the vitreous silica crucible manufacturing apparatus 1 can set the power density to the optimal range by setting the shape of the carbon electrode 13, it is possible to satisfy conditions such as the arc discharge output, the amount of raw material powder to be melted, which is defined by the diameter (size) of the vitreous silica crucible, and a melting temperature and conditions such as a necessary arc discharge duration, necessary electrode strength, and prevention of generation of electrode vibration. As a result, the vitreous silica crucible manufacturing apparatus 1 can generate arc flame which may supply the amount of heat required for arc melting to melting of the quartz powder molded body 11 and prevent the electrode vibration.

In addition, although the diameter R3 of the base end side of the diameter reduction portion 13c is equal to the uniform diameter R1 and the diameter reduction portion 13c has the truncated conical shape in this embodiment of the invention, the following configurations are possible.

Figure 6:
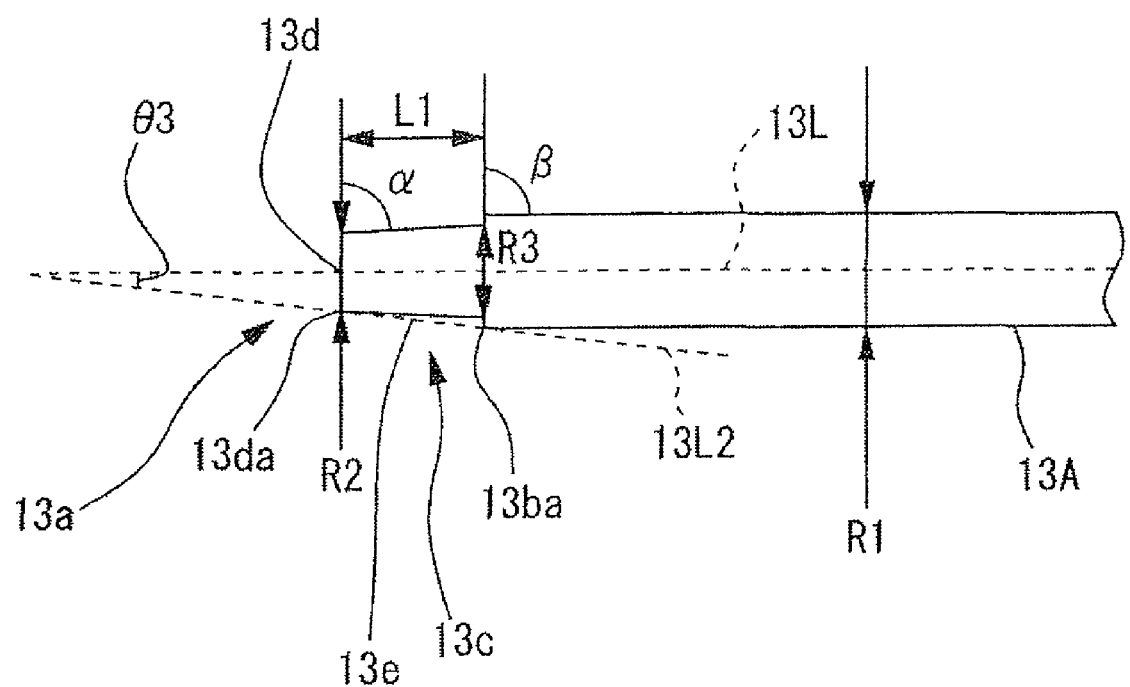
FIG. 6 is a schematic diagram showing a front end of a carbon electrode of a vitreous silica crucible manufacturing apparatus according to another embodiment of the present invention.

FIG. 6 is a schematic diagram showing a front end of a carbon electrode of a vitreous silica crucible manufacturing apparatus according to another embodiment of the invention.

As shown in FIG. 6, a carbon electrode 13A has a diameter R3<R1 and a diameter reduction portion 13c has a truncated conical shape. That is, a uniform diameter portion of a base end 13b and the diameter reduction portion 13c may form a step. In this case, an angle α and an angle β may be set to satisfy the above-described condition. In addition, an angle θ3 between a surface 13L2 and an electrode axis line 13L may be set to be equal to α or θ2, the surface 13L2 connecting an outer periphery 13da of a flat surface 13d to an outer periphery of end 13ba of the uniform diameter portion which forms the step.

Figure 7A:
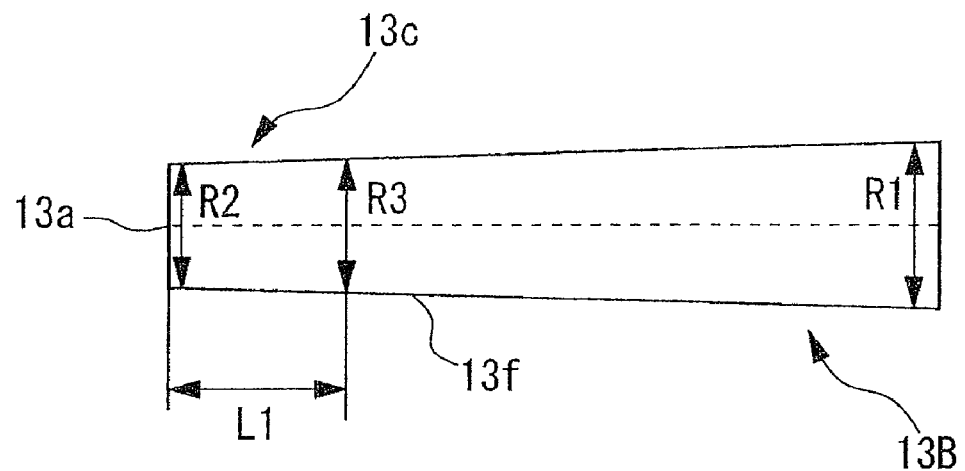
FIGS. 7A and 7B are schematic diagrams showing a front end of a carbon electrode of a vitreous silica crucible manufacturing apparatus according to another embodiment of the present invention.
Figure 7B:
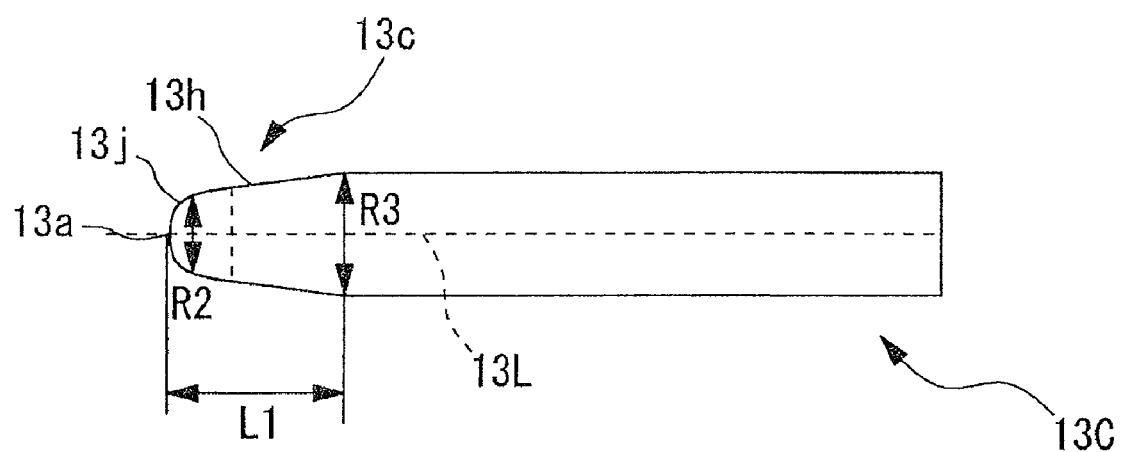

FIGS. 7A and 7B are schematic diagrams showing front end of a carbon electrode of a vitreous silica crucible manufacturing apparatus according to another embodiment of the invention.

In the carbon electrode of the present invention, as shown in FIG. 7A, a diameter is gradually reduced from a base portion to a front end 13a of a carbon electrode 13B, the diameter R2 of the front end 13a is set to be less than the diameter R1 of the base portion, and a lateral surface 13f has a truncated conical shape over the entire length. In addition, by rounding the front end 13a with respect to that shown in FIGS. 2 and 3, as shown in FIG. 7B, a base portion a contact portion in the front end 13a of the carbon electrode 13C becomes a lateral periphery surface 13h of the truncated cone continuous to the uniform diameter portion, the front end 13a from the truncated cone is smoothly continuous to the truncated cone, a curve in which a curvature discontinuous pint is not present in a cross-sectional contour along the axis line 13L of the carbon electrode 13, for example, an elliptical arc or a circular arc can be obtained. Out of these shapes, the shape not definitely having the outer periphery of the flat surface 13d may be set such that the distance between electrodes is nearest to one place such as the outer periphery 13da of the flat surface 13d shown in FIGS. 2 and 3.

Figure 8:
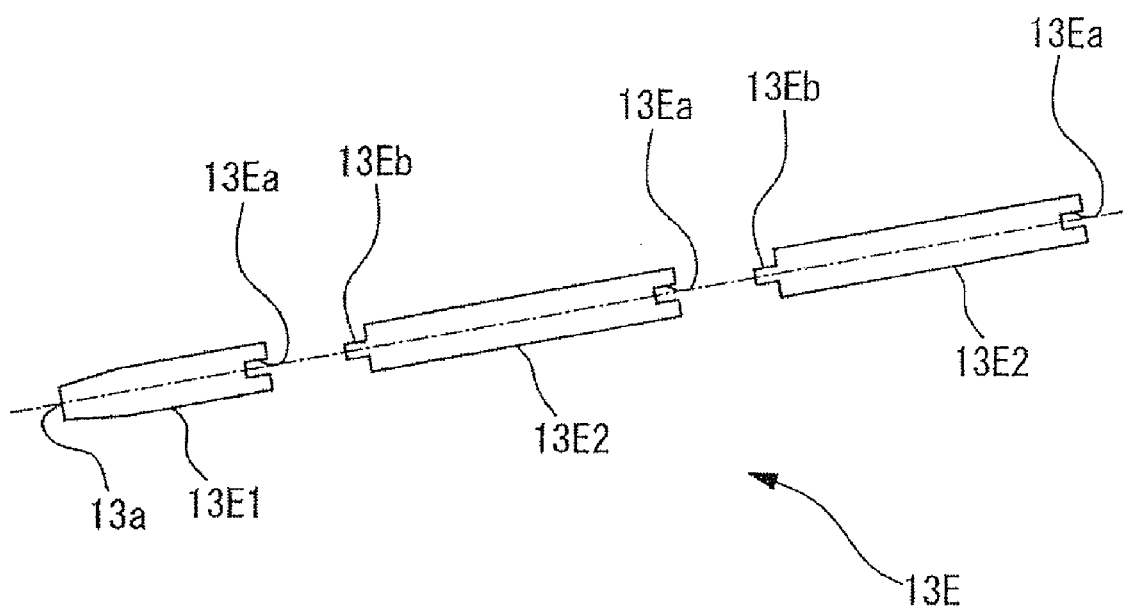
FIG. 8 is a schematic diagram showing a carbon electrode of a vitreous silica crucible manufacturing apparatus according to another embodiment of the present invention.

In addition, as the carbon electrode of the present invention, as shown in FIG. 8, a carbon electrode 13E having a connection structure may be used. The carbon electrode 13E is formed with a rod-like electrode 13E1 having a front end 13a for performing arc discharge and a plurality of electrodes 13E2 and 13E2 connected to the electrode 13E1. At this time, the front end 13a of the electrode 13E1 has a front end shape which is set as described above, and both the diameter of the base portion of the electrode 13E1 and the diameter of the outer shape of the electrode 13E2 are equally set to R1.

In the carbon electrode 13E, a female screw portion 13Ea is formed in one end (right end) of the electrode 13E1 which becomes the base end thereof, and a diameter reduction portion is formed in the other end (left end) thereof. Similarly, the female screw portion 13Ea and the male screw portion 13Eb are formed in both ends of the electrode 13E2, respectively, and the electrode 13E1 and the electrode 13E2 are formed to be extended by connecting the female screw portion 13Ea and the male screw portion 13Eb.

EXAMPLE

Hereinafter, examples of the present invention will be described.

Example 1

Using the vitreous silica crucible manufacturing apparatus of the present invention, arc discharge was performed under different conditions of R2 shown in Table 1 so as to manufacture the vitreous silica crucible, and generation of vibration and attachment of fume to the electrode were visually determined and compared. The result is shown in Table 1. Here, in the judgment, a stable degree of arc which is most desirable for manufacture of the vitreous silica crucible was denoted by "⊚", a desirable degree was denoted by "O", an undesirable degree was denoted by "x".

Crucible diameter: 32 inches
Output: 3,000 kVA
Treatment time: 30 minutes
Electrode shape: front end truncated cone
θ1/2: 10°
θ2: 4°
Carbon electrode diameter R1: 50 mm
Power density P/P2 of carbon electrode: 153 to 611 kVA/cm$^2$

TABLE 1

|  | *Exp. Example 1 | Exp. Example 2 | Exp. Example 3 | Exp. Example 4 | Exp. Example 5 | Exp. Example 6 | Exp. Example 7 |
|---|---|---|---|---|---|---|---|
| θ½ [°] |  |  |  | 10 |  |  |  |
| L1 [mm] |  |  |  | 120 |  |  |  |
| R1 [mm] |  |  |  | 50 |  |  |  |
| R2 [mm] | 40 | 35 | 30 | 43 | 50 | 28 | 25 |
| R2/R1 | 0.80 | 0.70 | 0.60 | 0.86 | 1.00 | 0.56 | 0.50 |
| P/R2 [kVA/cm$^2$] | 239 | 312 | 425 | 207 | 153 | 487 | 611 |
| Vibration | Absence | Absence | Absence | Absence | Absence | Presence | Presence |
| Attachment of fume | Absence | Absence | Absence | Presence | Presence | Absence | Absence |
| Judgment | ⊚ | O | O | X | X | X | X |

*Exp. = Experimental

From the above result, it can be seen that, in R2/R1<0.6, vibration is generated when arc discharge is started, and thus arc is unstable. In addition, it can be seen that R2/R1>0.8 is not suitable because arc discharge becomes stable, but silica fume is easily attached.

Example 2

Arc discharge was performed under the same condition as Example 1 except that R2 is set to a predetermined value of 30 mm and L1 is changed so as to manufacture the vitreous silica crucible, and generation of vibration and attachment of fume to the electrode were visually determined and compared. The result is shown in Table 2.

TABLE 2

|  | *Exp. Example 8 | Exp. Example 9 | Exp. Example 10 | Exp. Example 11 | Exp. Example 12 | Exp. Example 13 | Exp. Example 14 |
|---|---|---|---|---|---|---|---|
| θ½ [°] |  |  |  | 10 |  |  |  |
| R1 = R3 [mm] |  |  |  | 50 |  |  |  |
| R2 [mm] |  |  |  | 30 |  |  |  |
| L1 [mm] | 200 | 150 | 120 | 105 | 55 | 30 | 100 |
| L1 − x/tan(θ½) [mm] | 145 | 95 | 65 | 50 | 0 | −25 | +45 |
| Vibration | Absence | Absence | Absence | Slightly presence | Presence | Presence | Presence |
| Attachment of fume | Absence | Absence | Absence | Absence | Absence | Absence | Absence |
| Judgment | ◎ | ◎ | ◎ | ○ | X | X | X |

*Exp. = Experimental

From the above result, it can be seen that stable arc can be obtained if $L1-X/\tan(\theta 1/2)$ is 50 mm or When $L1-X/\tan(\theta 1/2)$ is too large, an undesirable result is obtained in view of cost for manufacturing the electrode. Thus, $L1-X/\tan(\theta 1/2)<150$ mm is preferable.

Example 3

Arc discharge was performed under the same condition as Example 1 except that R2 is set to a predetermined value of 30 mm and R3 is changed so as to manufacture the vitreous silica crucible, and generation of vibration and attachment of fume to the electrode were visually determined and compared. The result is shown in Table 3.

TABLE 3

|  | *Exp. Example 15 | *Exp. Example 16 | *Exp. Example 17 | *Exp. Example 18 | *Exp. Example 19 | *Exp. Example 20 |
|---|---|---|---|---|---|---|
| θ½ [°] |  |  |  | 10 |  |  |
| L1 [mm] |  |  |  | 120 |  |  |
| R1 [mm] |  |  |  | 50 |  |  |
| R2 [mm] |  |  |  | 30 |  |  |
| R3 [mm] | 50 | 45 | 43 | 40 | 38 | 35 |
| R3/R1 [—] | 1.00 | 0.90 | 0.86 | 0.80 | 0.76 | 0.70 |
| Vibration | Weak | Absence | Absence | Slightly presence | Presence | Presence |
| Attachment of fume | Absence | Absence | Absence | Absence | Absence | Absence |
| Judgment | ◎ | ◎ | ◎ | ○ | X | X |

*Exp. = Experimental

From the above result, it can be seen that, in $R3/R1<0.8$, arc becomes unstable because vibration is generated.

Example 4

Arc discharge was performed with a front end angle)(θ=4° of an electrode under the same condition as Example 1 except that R2 is set to a predetermined value of 30 mm and θ1 is changed so as to manufacture the vitreous silica crucible, and generation of vibration and attachment of fume to the electrode were visually determined and compared. The result is shown in Table 4.

TABLE 4

|  | *Exp. Example 21 | *Exp. Example 22 | *Exp. Example 23 | *Exp. Example 24 | *Exp. Example 25 | *Exp. Example 26 |
| --- | --- | --- | --- | --- | --- | --- |
| L1 [mm] | | | 120 | | | |
| R1 [mm] | | | 50 | | | |
| R2 [mm] | | | 30 | | | |
| θ1/2 [°] | 5 | 10 | 15 | 20 | 4 | 25 |
| Vibration | Weak | Absence | Absence | Absence | Presence | Absence |
| Attachment of fume | Absence | Absence | Absence | Slightly presence | Absence | Presence |
| Judgment | ○ | ◎ | ◎ | ○ | X | X |

*Exp. = Experimental

From the above result, it can be seen that, if $\theta 1/2$ is 5° or less, arc disperses from the portion other than the front end of the electrode, vibration is generated and thus an undesirable result is obtained. It can be seen that, if $\theta 1/2$ exceeds 20°, fume is easily attached to the electrode and thus an undesirable result is obtained.

Under a condition of R2=R1, a problem may occur because arc disperses at various places. Under a condition of R2<0.6R1, the electrode is excessively thin such that vibration is generated and thus an undesirable result is obtained. Originally, it is important that a range of 0.7R1 or less is set to 50 to 100 mm.

What is claimed is:

1. A vitreous silica crucible manufacturing apparatus, comprising:
    a plurality of carbon electrodes configured to heat and melt raw material powder by arc discharge, wherein
    a value of a ratio R2/R1 of a diameter R2 of a front end of each of the carbon electrodes to a diameter R1 of a base end thereof is set in a range of 0.6 to 0.8,
    a flat surface which is approximately perpendicular to an axis line is formed on the front end of each of the carbon electrodes,
    each of the carbon electrodes have a diameter reduction portion formed at a front end position and reduced in diameter from a diameter R3 of a base end side to the diameter R2 of the front end, and
    a length L1 of the diameter reduction portion, the diameter R2 of the front end, and the diameter R1 of the base end are set such that a value of L1−(X/tan(θ1/2)) is set in a range of 50 to 150 mm when an angle between the axis lines of the carbon electrodes is θ1 and X=(R1−R2)/2.

2. The vitreous silica crucible manufacturing apparatus as claimed in claim 1, wherein
    a value of a ratio R3/R1 of the diameter R3 of the base end side of the diameter reduction portion to the diameter R1 of the base end of each of the carbon electrodes is set in a range of 0.8 to 1.

3. The vitreous silica crucible manufacturing apparatus as claimed in claim 1, wherein
    an angle α between a lateral periphery surface of the diameter reduction portion and the flat surface, the length L1 of the diameter reduction portion, the diameter R2 of the front end, and the diameter R1 of the base end are set to satisfy a relationship of tan(90°−α)=X/(L1−50) to X/(L1−150) when X=(R1−R2)/2.

4. The vitreous silica crucible manufacturing apparatus as claimed in claim 3, wherein
    a half of the angle θ1 between the axis lines of the carbon electrodes is in a range of 5° to 20°, and the angle α between the lateral periphery surface of the diameter reduction portion and the flat surface is set to satisfy a relationship of θ1>2×(90−α).

5. The vitreous silica crucible manufacturing apparatus as claimed in claim 1, further comprising:
    a mold configured to define an outer shape of the vitreous silica crucible; and
    an electrode position setter configured to set positions of the carbon electrodes, wherein
    the carbon electrodes are positioned above the mold.

6. The vitreous silica crucible manufacturing apparatus as claimed in claim 5, wherein
    the carbon electrodes include a first carbon electrode and a second carbon electrode connected to a base end of the first carbon electrode.

7. The vitreous silica crucible manufacturing apparatus as claimed in claim 5, wherein
    the electrode position setter has support portions configured to support the carbon electrodes such that a distance between the electrodes is able to be set.

8. The vitreous silica crucible manufacturing apparatus as claimed in claim 7, wherein
    the support portions include an angle setting shaft configured to rotatably support the carbon electrodes and rotary actuators configured to control rotation angles of the carbon electrodes.

9. The vitreous silica crucible manufacturing apparatus as claimed in claim 7, wherein
    the electrode position setter further includes a horizontal mover configured to move the support portions in a horizontal direction and a vertical mover configured to integrally move the plurality of support portions and the horizontal mover in a vertical direction.

10. The vitreous silica crucible manufacturing apparatus as claimed in claim 1, wherein
    the plurality of carbon electrodes include three carbon electrodes disposed in a reverse triangular pyramid shape, an apex of which is located on a lower side.

11. The vitreous silica crucible manufacturing apparatus as claimed in claim 10, wherein
    a half of the angle θ1 between the axis lines of the carbon electrodes is set in a range of 5° to 20°.

12. The vitreous silica crucible manufacturing apparatus as claimed in claim 10, wherein
    an angle α between the lateral periphery surface of the diameter reduction portion and the flat surface is set to satisfy a relationship of θ1>2×(90−α).

13. The vitreous silica crucible manufacturing apparatus as claimed in claim 10, wherein each of the carbon electrodes is formed such that one carbon electrode comes in contact with another carbon electrode only at one place.

14. The vitreous silica crucible manufacturing apparatus as claimed in claim 10, wherein the plurality of carbon electrodes is formed such that only one place of one carbon electrode is nearest to another carbon electrode.

* * * * *